United States Patent
Vernal et al.

(10) Patent No.: US 7,453,875 B2
(45) Date of Patent: Nov. 18, 2008

(54) QUERYING FOR SERVICES USING SOAP OVER UDP

(75) Inventors: Michael S. Vernal, Seattle, WA (US);
Erik B. Christensen, Seattle, WA (US);
Martin Gudgin, Sale (GB); John R.
Justice, Bellevue, WA (US); Gopal
Kakivaya, Sammamish, WA (US);
David Langworthy, Kirkland, WA (US);
Yaniv Pessach, Redmond, WA (US);
Jeffrey Schlimmer, Redmond, WA (US); Elliot Waingold, Seattle, WA (US); Kenneth D. Wolf, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 559 days.

(21) Appl. No.: 11/087,139

(22) Filed: Mar. 23, 2005

(65) Prior Publication Data

US 2006/0215571 A1 Sep. 28, 2006

(51) Int. Cl.
H04L 12/28 (2006.01)
H04L 12/56 (2006.01)
H04J 3/26 (2006.01)
G06F 15/16 (2006.01)

(52) U.S. Cl. .................... 370/389; 370/390; 370/395.3; 370/395.5; 370/395.52; 370/431; 370/432; 709/227; 709/228; 709/229; 709/230; 709/231; 709/232

(58) Field of Classification Search ................. 370/389, 370/390, 395.3, 395.5, 395.52, 431, 432; 709/227–232
See application file for complete search history.

(56) References Cited

U.S. PATENT DOCUMENTS

| 7,085,841 | B2 * | 8/2006 | Edwards et al. ............. 709/230 |
| 7,185,209 | B2 * | 2/2007 | Langworthy et al. ........ 713/193 |
| 2002/0174178 | A1 * | 11/2002 | Stawikowski ............... 709/203 |
| 2003/0074413 | A1 * | 4/2003 | Nielsen et al. .............. 709/206 |
| 2003/0131129 | A1 * | 7/2003 | Becker et al. ............... 709/238 |
| 2004/0158823 | A1 * | 8/2004 | Saint-Hilaire et al. ....... 717/140 |
| 2004/0199638 | A1 * | 10/2004 | Kaler .......................... 709/227 |
| 2004/0213204 | A1 * | 10/2004 | Yang .......................... 370/352 |
| 2005/0021799 | A1 * | 1/2005 | Imamura et al. ............ 709/230 |
| 2005/0073967 | A1 * | 4/2005 | Hennessey et al. .......... 370/312 |
| 2006/0072532 | A1 * | 4/2006 | Dorenbosch et al. ........ 370/342 |
| 2006/0112180 | A1 * | 5/2006 | Vedula ....................... 709/227 |
| 2006/0167828 | A1 * | 7/2006 | Di Luoffo et al. ............. 706/60 |
| 2007/0124797 | A1 * | 5/2007 | Gupta et al. .................. 726/1 |

* cited by examiner

Primary Examiner—Brenda Pham
Assistant Examiner—Xavier Szewai Wong
(74) Attorney, Agent, or Firm—Workman Nydegger

(57) ABSTRACT

A sending computer system can identify one or more available network resources at one or more network computers by sending a request for services using Simple Object Access Protocol (SOAP) over User Datagram Protocol (UDP). In particular, the sending computer system prepares a SOAP message that includes a request for available resources. The sending computer system then encapsulates the SOAP message into a user datagram, and sends the user datagram to one or more identifiable computer systems on the network. In one implementation, the sending computer system sends the user datagram to a multi-cast Uniform Resource Identifier (URI). The receiving computer system receives the message through UDP, unpacks the message, and responds to the SOAP message request. Accordingly, the sending computer system can query multiple computer systems in an efficient manner without necessarily incurring the overhead otherwise associated with connection-oriented communication.

19 Claims, 4 Drawing Sheets

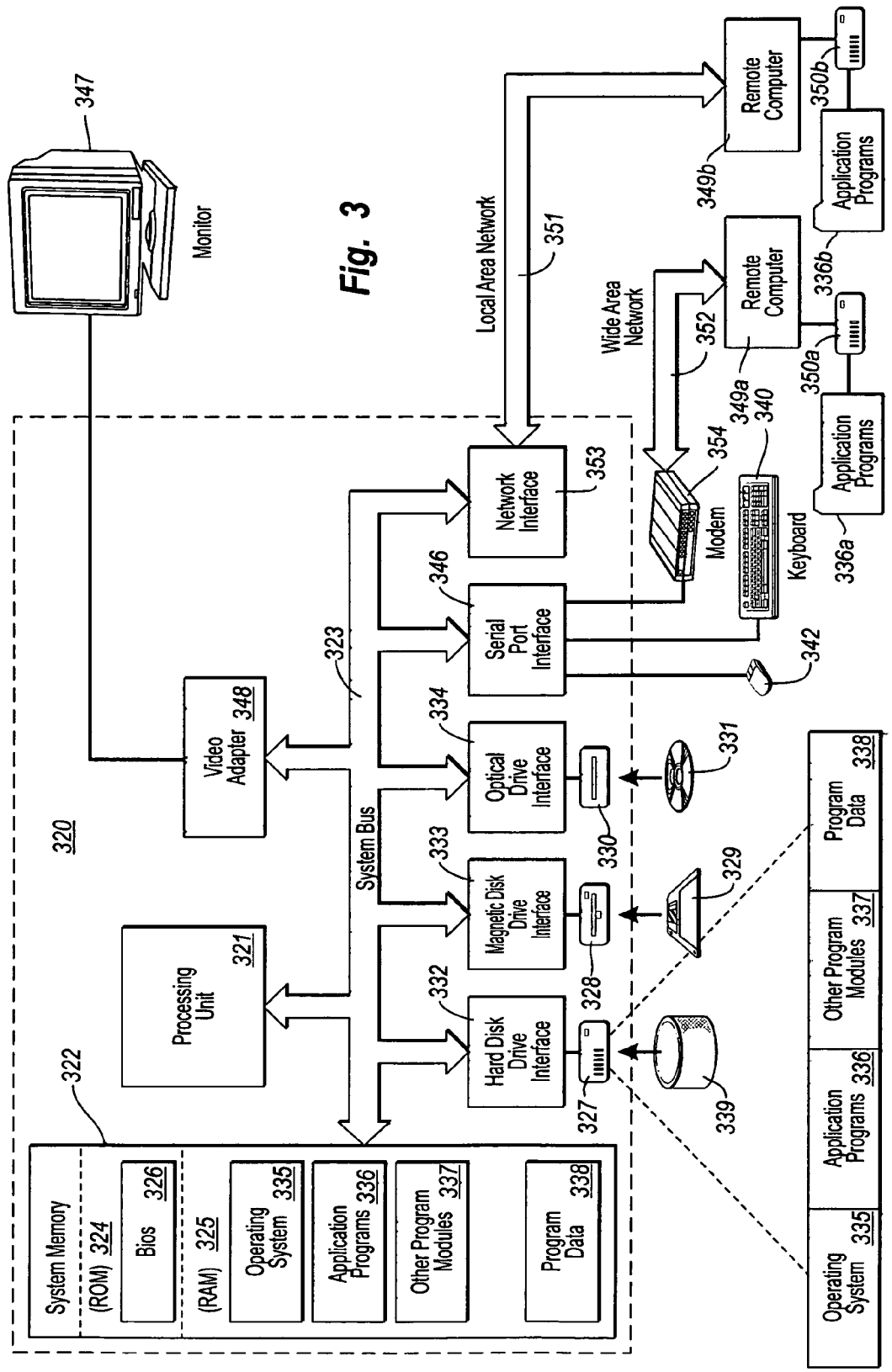

QUERYING FOR SERVICES USING SOAP OVER UDP

CROSS-REFERENCE TO RELATED APPLICATIONS

N/A

BACKGROUND OF THE INVENTION

1. The Field of the Invention

This invention relates to systems, methods, and computer program products for communicating SOAP messages using a User Datagram Protocol.

2. Background and Relevant Art

As computerized systems have increased in popularity, so also have the needs to distribute resources of computer systems in small networks, such as local area networks, as well as large or global networks such as the Internet. In general, computer systems and related devices exchange messages and distribute resources for a variety of reasons, whether, for example, to simply exchange personal electronic messages, to sell merchandise, provide account information, to share files, and so forth. One will appreciate, however, that as computer systems have become increasingly more sophisticated for individual use, the challenges associated with sharing data and resources on a network have also increased.

Historically, one problem with sharing data or resources among networked computer systems is that computer systems that use different operating systems could not easily share files or resources with another. This was ameliorated to some extent with certain scripting languages, such as Hypertext Markup Language ("HTML"), Extensible Markup Language ("XML"), and the like. These scripting languages allowed users to share files in a commonly-readable format with other users over a network using virtually any different type of operating system.

In one conventional example, a user shares an HTML file with another user on a network by communicating the HTML file to the other user through a network "connection" to the other user's computer. The connection typically involves a specific network link between the two computers using several layers of communication protocols on both the sending and receiving user's respective computer systems. For example, a connection between two users for transmitting an HTML file might involve use of the Hypertext Transfer Protocol ("HTTP"), which is layered on top of the Transmission Control Protocol ("TCP"), and which in turn is layered on top of the Internet Protocol ("IP"), and so on. Furthermore, the HTTP connection is typically directed between specific ports (e.g., port 80) on both the sending and receiving computer systems. Presently, there are many different ports and layered communication protocols that can be used on network-capable computer systems for sharing files and resources.

One can appreciate that as networked communication has increased among CD Air known and unknown parties, networks administrators are increasingly limiting the amount of files and resources available. For example, it is common now to allow outside access to files and resources only though a small number of commonly used communication protocols and/or communication ports, such as HTTP, UDP, and the like, or, for example, only allowing communication through a specific port. At least to address this and other concerns, Simple Object Access Protocol ("SOAP") messaging was developed using XML, in order to allow cross-platform distribution of files and resources using a commonly allowed communication protocol—HTTP. Thus, SOAP messaging is becoming increasingly popular as a tool in distributed computing environments, even those involving relatively closed networks. Unfortunately, the protocols for communicating SOAP messages (e.g., HTTP, TCP, etc.) make SOAP messages inconvenient in some cases for certain functions of a distributed computing environment, particularly for such functions as identifying other available network resources.

For example, SOAP messages are typically transmitted using HTTP, which in turn uses a TCP connection between one computer and another computer to communicate data. To use SOAP to inquire whether a remote computer system on the network has an available service, a local computer would ordinarily need to request a one-to-one TCP connection with the remote computer. The remote computer would then have to accept the one-to-one TCP connection, and then receive another response from the local computer that the local computer is ready to communicate. Once this basic, three step process is completed, one or more SOAP queries and response could be communicated between the two computer systems, and files and resources could be shared where appropriate.

One can appreciate, therefore, that using SOAP messaging to identify available services on multiple remote computers on a network can involve a significant amount of resource overhead, as well as communication delay. In particular, the overhead of initiating a unique TCP connection (e.g., the three-step process) with multiple network computers could be impractical for a number of applications, such as using SOAP for real-time services, or for using services over long network distances. Furthermore, the one-to-one nature of connected communication is only part of the potential problem. For example, besides being an essentially one-to-one connection protocol, TCP has other features, such as error correction and retransmission of errant data, which can lead to additional communication delays.

By contrast, UDP, which is also a fairly common communication protocol, does not use connection-oriented communication, and so does not have the overhead associated with establishing a different, unique connection with each different remote IP Address and/or Port number of interest. Furthermore, UDP contrasts with TCP in that it allows for one-to-many data transmission, rather than one or multiple one-to-one connection-oriented communication sessions. In particular, UDP allows data packets to be sent to a single multi-cast address, which distributes the data packets to multiple other computers at multiple other corresponding addresses. Still further, UDP does not implement error checking functionality, and so does not run into some of the delay that might otherwise be associated with other protocols such as TCP.

Unfortunately, there are a number of different difficulties that make conventional UDP unsuitable for identifying available network services in a distributed computing environment, particularly doing so with SOAP messages. For example, UDP is not configured with request-response mechanisms that would be used for querying available services on a network, as UDP is basically a "send and forget" protocol. Furthermore, there is no present addressing scheme whereby SOAP can invoke a network address with UDP in the first instance. In particular, the present Universal Resource Indicators ("URI's", such as "http://www.host.com/file") used in SOAP messages typically invoke connection-oriented transfer protocols (e.g., "HTTP://"), which are layered on top of connection-oriented transmission protocols (e.g., TCP). Still further, UDP typically limits the size of data packets that can be communicated using UDP, which can create other difficulties with SOAP messaging.

Accordingly, an advantage in the art can be realized with systems, methods, and computer program products that allow the use of SOAP messages to be used to identify network resources in a distributed environment without necessarily requiring the overhead typically associated with connection-oriented communication. In particular, an advantage in the art can be realized with systems and methods that allow the use of SOAP messaging to implement UDP in a request-response fashion.

BRIEF SUMMARY OF THE INVENTION

The present invention solves one or more of the foregoing problems in the prior art with systems, methods, and computer program products that allow querying for available services at multiple computer systems using SOAP messaging over UDP. In at least one implementation of the present invention, a SOAP message is configured to be sent within a UDP datagram to multiple remote computer systems, such that a response can also be returned through UDP.

For example, a method from a sending computer perspective in accordance with an implementation of the present invention comprises identifying one or more computer systems on a network, and encapsulating a SOAP message to be sent to the identified one or more computer systems within a user datagram. In particular, the SOAP message will contain a request for a response from each of the one or more computer systems to which the message is sent. The method also comprises sending the user datagram to the identified one or more computer systems through a UDP communication protocol.

From the receiving computer system perspective, a method in accordance with the present invention comprises receiving a user datagram from a sending computer system that contains a SOAP message, where the SOAP message includes a request for one or more available components at the receiving computer system. If the receiving computer system has a reply to send, the receiving computer system then identifies a reply address from at least a portion of the SOAP message, and encapsulates a SOAP response message that is placed within a response user datagram. The method from the receiving computer perspective also comprises replying to the sending computer system by sending the response user datagram to the identified reply address through a UDP communication protocol. The response user datagram includes a SOAP reply message that identifies one or more available components at the receiving computer system.

Additional features and advantages of exemplary implementations of the invention will be set forth in the description which follows, and in part will be obvious from the description, or may be learned by the practice of such exemplary implementations. The features and advantages of such implementations may be realized and obtained by means of the instruments and combinations particularly pointed out in the appended claims. These and other features will become more fully apparent from the following description and appended claims, or may be learned by the practice of such exemplary implementations as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 3 illustrates a suitable computing environment for practicing one or more of the implementations in accordance with the present invention.

DETAILED DESCRIPTION OF THE PREFERRED EMBODIMENTS

The present invention extends to systems, methods, and computer program products that allow querying for available services at multiple computer systems using SOAP messaging over UDP. In at least one implementation of the present invention, a SOAP message is configured to be sent within a UDP datagram to multiple remote computer systems, such that a response can also be returned through UDP.

As will be understood from the following specification and claims, one aspect of the present invention relates to encapsulating a SOAP message within a user datagram. Another aspect of the invention relates to formatting the SOAP message so that it fits within the size parameters of a conventional user datagram. Still another aspect of the invention relates to sending the user datagram to one or more computers over UDP by a specific address, or by addressing only a multi-cast URI. Further aspects of the invention relate to constructing a reply user datagram based on information contained (or absent) in the received user datagram from the sending computer system. Accordingly, the present specification and claims relate in part to using SOAP messaging over UDP in a request-response format.

Figure 1A:
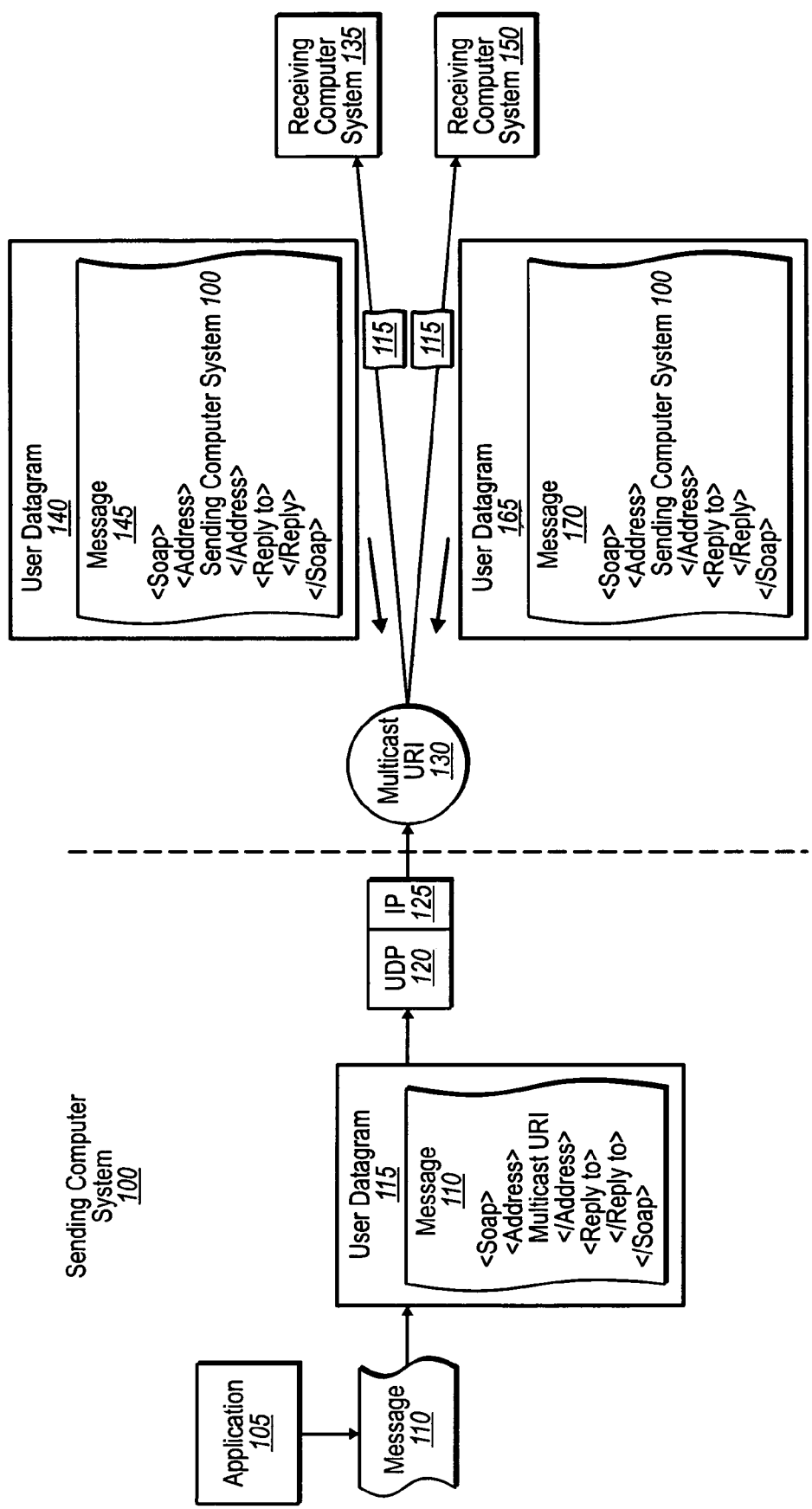
FIG. 1A illustrates a schematic overview of an implementation of the present invention in which a SOAP message is sent to one or more receiving computer systems using a user datagram protocol.

For example, FIG. 1A illustrates a schematic overview of a system in which a sending computer system 100 sends a SOAP message 110 to one or more receiving computer systems 135, 150 using the user datagram protocol ("UDP"). For example, the sending computer system 100 has just joined a network, and may therefore be interested in identifying available files or resources of other network computers on the network. Alternatively, the sending computer system 100 may have been temporarily "offline", or may for other reasons desire to refresh, and find any newly available files or resources on the network. Of course, there may be any number of reasons why a sending computer system 100 will desire to identify available network files or resources.

In general, an application 105 at sending computer 100 creates a SOAP message 110, which includes a request for available services. When the message 110 is created, the message 110 is initially present on the computer system 100 as an in-memory data structure (which is a representation of the message 110 "info-set"). The sending computer system 100, such as by direction by the application 105 or user, then decides to send the in-memory data structure to another computer system on the network using UDP. Since the user datagram, which is used as the vehicle for carrying a message over UDP, is of a fixed size, the sending computer system 100 (or application 105, or user) next decides how to encode the in-memory data structure into user datagram 115.

For example, the sending computer system 100 may decide to use textual encoding if the in-memory data structure is sufficiently small to place inside a user datagram. Similarly, application 105 (or user) may decide to send the message using textual encoding due to interoperability issues with other computer systems, or with other corresponding applications to which the message 110 is directed. For example, sending computer system 100 may identify information that other computer systems (e.g., receiving computer system 135) are only able to support text encoding, while other computer systems (e.g., receiving computer system 150) are only able to support a certain type of binary encoding.

If the application 105 has a policy in place of only sending binary encoded user datagrams, the application 105 may decide not to send user datagrams to those receiving computer systems that are identified as only able to receive text encoding. For example, application 105 may have a policy in place to use binary encoding for the in-memory data structure as a default format to condense the overall message 110 sizes, since such messages might tend to be larger for the specific application. As such, sending computer system 100 might have a policy to use conventional "zip" or "gzip" encoding formats as a default behavior. Alternatively, the decision to use text or binary encoding might be based on a mutually agreed-to policy with other receiving computer systems on the network based on the type of SOAP messages spoken. Accordingly, the decision to use text or binary encoding will typically be a predetermined policy of the message-generating, or client-side, infrastructure (e.g., application 105), rather than necessarily a decision made at the time of creating each relevant SAOP message.

With any relevant encoding decisions in place, the sending computer system 100 creates a user datagram 115; In one implementation, the sending computer system (e.g., 100) does so-by and using only the first few bytes (e.g., 32 bytes) of the user datagram 115 to identify the encoding (e.g., text or binary) that is used for the message (e.g., 110). (The encoding type is written in the user datagram 115 in one aspect to avoid using the conventional SOAP headers "Content Type" and/or "Mime Content Type", which can be relatively large.)

In particular, the sending computer system 100 might use only the first byte of the user datagram 115 to identify that encoding information follows in subsequent bytes. For example, sending computer system 100 and receiving computer systems 135, 150 might agree in advance that a first byte of "0" indicates that encoding information follows in the next set of bytes as determined by a framing protocol. The sending computer system 100 could then insert a "0" in the first byte, and then place encoding information in the next set of bytes that indicates "zip" encoding in SOAP message 110.

The sending computer system can also use the first 8 bytes to identify whether the encoding type is text/xml encoding, or whether the encoding type is an "other" format. The "other" encoding format can be based on an extensible set of encodings (including binary), that are mutually understood between sending and receiving computer systems. The following are examples of some extensible encodings using the first 8 bytes of the user datagram.

EXAMPLE 1 text/xml

Example 1 is distinguished from Example 2 below primarily by the first byte. For example, if the first byte is non-zero (i.e., "1"), then the encoding type will indicate that it is based on Example 1. If the first byte is "0", however, then the encoding type will be indicated as being based on Example 2. This is possible at least in part since text/xml cannot start with byte 0. The following are extensible elements in a sequence of bytes for Example 1.

utf8(<Envelope><Header/><Body/></Envelope>)

EXAMPLE 2

Other Encodings

Example 2 illustrates the use of additional syntax to identify the encoding, the additional syntax sometime being referred to as "message framing". To identify the binary format (content-type: application/soap+msbin1), the sequence of bytes after the first byte (i.e., "0") can be written as follows.

octet(0)—FramingVersionRecord
octet(1)—FramingMajorVersion
octet(0)—FramingMinorVersion
octet(1)—FramingModeRecord
octet(1)—FramingSingletonMode
octet(3)—FramingKnownEncodingRecord
octet(7)—FramingBinaryKnownEncoding
octet(5)—FramingUnsizedEnvelope utf8(<Envelope><Header/><Body/></Envelope>)

Framing, however, can also be used to identify other encodings, such as Message Transmission Optimization Mechanism ("MTOM"), as shown below.

octet(0)—FramingVersionRecord
octet(1)—FramingMajorVersion
octet(0)—FramingMinorVersion
octet(1)—FramingModeRecord
octet(1)—FramingSingletonMode
octet(3)—FramingKnownEncodingRecord
octet(7)—FramingMTOMKnownEncoding
octet(5)—FramingUnsizedEnvelope utf8(<Envelope><Header/><Body/><Envelope>)

The framing format can also be used to identify arbitrary encodings, such as the encoding "application/myencoding" used by way of example below.

octet(0)—FramingVersionRecord
octet(1)—FramingMajorVersion
octet(0)—FramingMinorVersion
octet(1)—FramingModeRecord
octet(1)—FramingSingletonMode
octet(4)—FramingUnknownEncodingRecord
utf8(applicication/myencoding)
octet(5)—FramingUnsizedEnvelope utf8(<Envelope><Header/><Body/></Envelope>)

One will appreciate, however, that the preceding examples represent one or more ways of defining encoding type, and do not therefore define an exclusive list. In particular, there can be any number of ways for representing encoding information in a size-constrained user-datagram.

In any event, sending computer system 100 then converts the in-memory data structure representation of message 110, based on the encoding policy, into corresponding octets (or sequences of bits). The sending computer system 100 then places the octets (i.e., message 110) into the user datagram 115. For example, FIG. 1A shows that user datagram 115 contains message 110.

To ensure that message 110 is sent and received through the UDP protocol, the sending computer system 100 can prepare the message 110 with a URI scheme that invokes UDP in an endpoint reference as follows.

soap.udp://<host>[: port>][/<rel_path>][?<query>]

This syntax might therefore be invoked for computer 135 as:

soap.udp://www.computer135.com:30/dirl/?available.services

Thus, SOAP over UDP is invoked as the transfer scheme from the start, rather than invoking "HTTP://", as is sometimes done. One will appreciate, however, that using "soap.udp" to invoke the transfer scheme in the URI is not necessary in all cases. For example, the sending computer 100 can address UDP in another header, and address a specific UDP port used by the corresponding receiving computer system in the URI. The sending computer system 100 may also simply address computer 135 directly without reference to a port number, which allows the receiving computer to use a default UDP port.

In addition, rather than :a single URI to a specific receiving computer, the sending computer system 100 may also simply address multicast URI 130 (with or without reference to any port numbers). For example, a port number might not be specified where there is a pre-arranged defaulting behavior for using UDP at the URI. In general, multi-cast URI 130 is a network reference to a file (or corresponding function) that, when called, sends information received in the request to any one or more additional addresses named in the file or function. In one implementation, the sending computer system 100 indicates in the URI form that the address is a uni-cast or a multi-cast address when the address references an IP address (e.g., "soap.udp://ip-address/path"), rather than a resolvable host name (e.g., "soap.udp://www.host.com/path"). If the address references a host name, a domain name system ("DNS") query will first be instituted to resolve the domain name. In other cases, the URI may be specifically defined as a multi-cast URI (e.g., "urn:schemas-xmlsoap.org:ws:2005:03discovery").

In any event, FIG. 1A shows that the sending computer system 100 passes the user datagram 115 through UDP layer 120 and IP layer 125 and ultimately on to multicast URI 130. The multicast URI 130 then forwards user datagram 115 to receiving computer systems 135 and 150 as separate (or duplicate) user datagrams. Upon receiving the user datagram 115, FIG. 1A also shows that receiving computer systems 135 and 150, in turn, process the request contained in message 110, and send a reply user datagram 140 and 165, respectively, back to the sending computer system 100.

There are any number of ways in accordance with the present invention in which the receiving computer system (e.g., 135, 150, etc.) can construct a reply user datagram 140, 165. One will appreciate, however, that a reply may not occur in all cases. For example, the relevant receiving computer system may not have any available services, if that is the nature of the request, and so a reply may not be required by the requesting computer system in that case. Alternatively, the receiving computer system may simply not understand the request, and therefore also not construct a reply message.

In any event, if the relevant receiving computer system determines to construct a reply upon processing the request (e.g., "?available.services", or some other command in the SOAP envelope), the receiving computer system can perform the following. For example, an application (not shown) at the respective receiving computer system prepares a reply SOAP message 145, 170, which can also be encoded using text or binary formats (or the like), as appropriate. The reply SOAP message is addressed to sending computer system 100 in accordance with information provided in received SOAP message 110. The receiving computer system 135 then encapsulates the SOAP message into a response user datagram (e.g., 140, 165), and sends the reply.

Figure 1B:
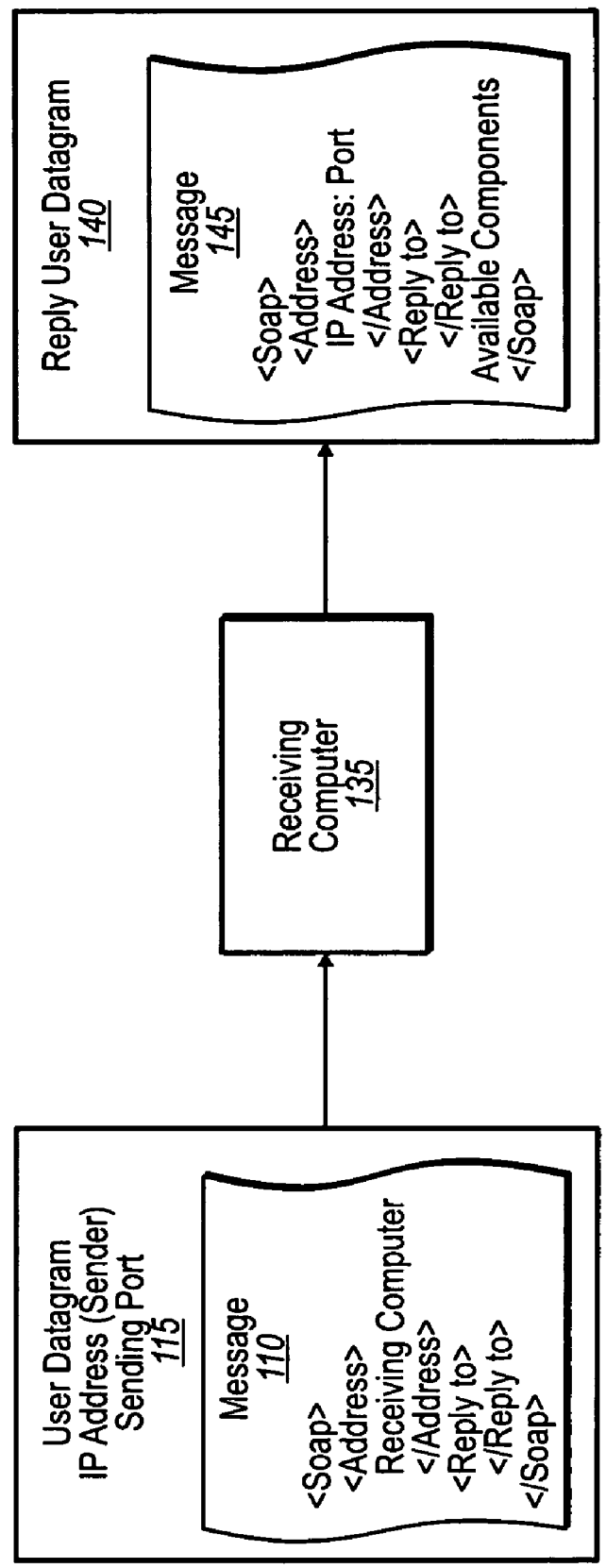
FIG. 1B illustrates a schematic overview in accordance with an implementation of the present invention where a receiving computer system of FIG. 1A constructs a reply user datagram based on the SOAP message received from the sending computer system using the user datagram protocol.

FIG. 1B illustrates how reply address information can be found or inferred in SOAP message 110. For example, in the simplest case where the reply address and port information is included in the received SOAP message 110, the receiving computer system 135 can simply insert the "reply to" address into an address header of the reply SOAP message 145. Alternatively, as shown in FIG. 1B, message 110 may contain no response address information, such as a "<ReplyTo>" header of received message 110 that contains no address information. In other implementations, the "<ReplyTo>" header of the SOAP message 110 may simply be omitted to conserve space in the user datagram 115.

FIG. 1B, therefore, shows that receiving computer system 135 simply extracts the IP address and port information from the UDP and IP layers of the user datagram 115. Receiving computer system 135 then constructs an address field of the SOAP message 145. With reference to the previous address syntax, the response address in message 145 might appear as "soap.udp://www.computer100.com:2553P". Once the response user datagram 140 has been created, the respective receiving computer system (e.g., 135, 150) sends the response user datagram 140 back to the sending computer system 100 over UDP. Computer system 100 then receives the response user datagram over UDP, decodes the contained SOAP message, as appropriate, and identifies the response data within the SOAP message. The original sending computer system 100 is thus apprised of available (or not available) resources at the responding computer system (i.e., computer systems 135, 150, etc.) through a UDP-based request-response mechanism.

Figure 2:
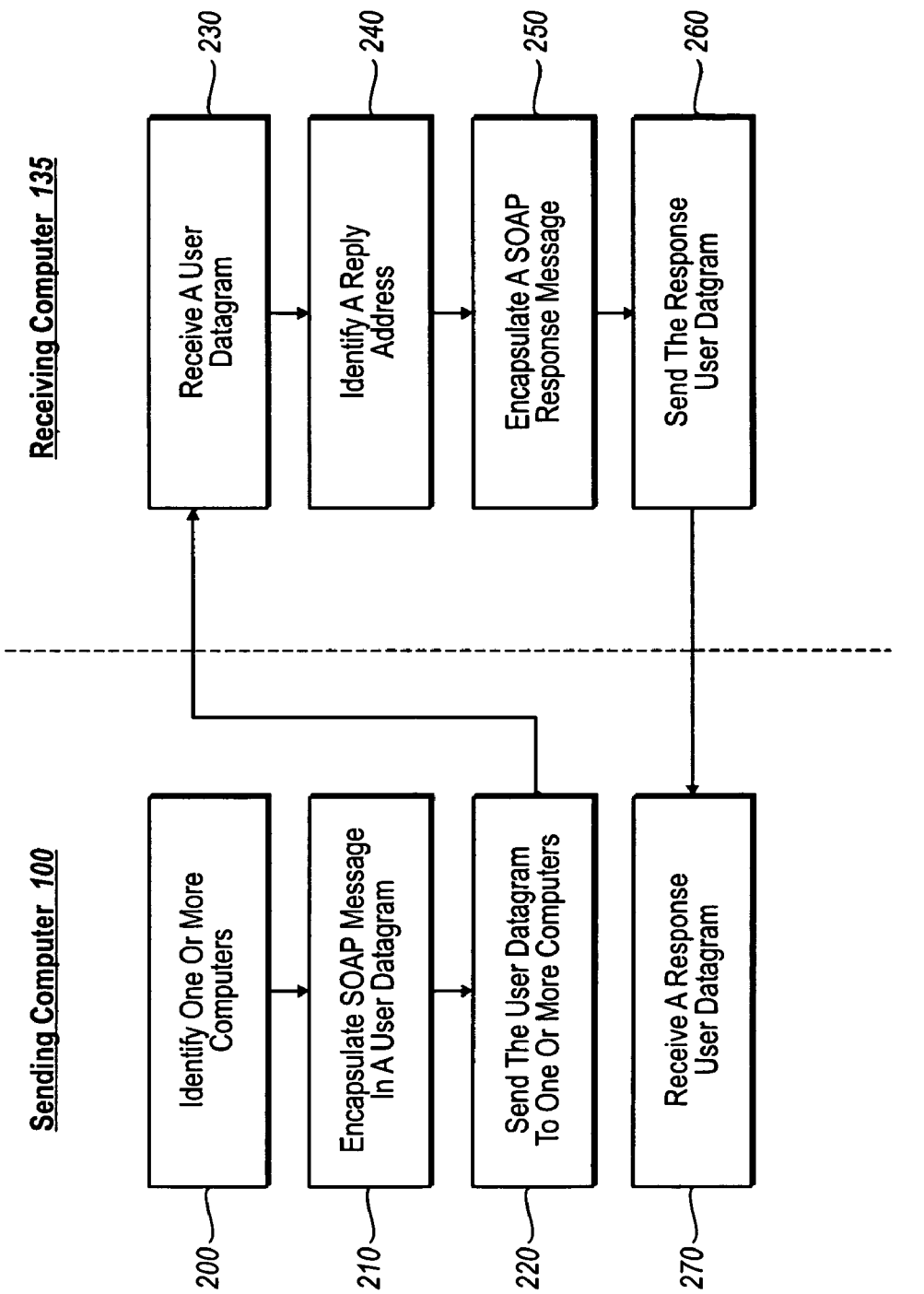
FIG. 2 illustrates a flow chart of methods from the sending computer system perspective and from the receiving computer system perspective for sending and receiving SOAP messages using the user datagram protocol.

Accordingly, the schematic diagrams of FIGS. 1A and 1B describe a number of ways in which services can be identified on a network in an efficient manner using SOAP over UDP. The present invention can also be described in terms of one or more acts for performing methods in accordance with the present invention for identifying network components. In particular, FIG. 2 illustrates methods from both the sending and receiving computer system perspectives for identifying available network components using SOAP over UDP. The following methods are described with reference to the schematic diagrams of FIGS. 1A and 1B.

As shown, the method of FIG. 2 from the sending computer perspective comprises an act 200 of identifying one or more computers. Act 200 includes identifying the presence of one or more computer systems on a network. For example, sending computer system 100 identifies computer system 135 and computer system 150 (with reference at least to their corresponding network addresses) as potential computer systems for providing one or more network components. In some cases this is done by identifying "presence" information stored at a central server on the network, the presence information based on the "offline" or "online" status of other network computer systems. Of course, there are a number of ways of identifying other computer systems on a network. The sending computer system 100 can also identify what ports the respective, identified one or more computer systems are using for UDP. In other cases, the sending computer system 100 simply identifies, for example, a multi-cast URI (e.g., 130), which can be used for sending a SOAP message over UDP to multiple computer systems on the network.

FIG. 2 also shows that the method from the sending computer 100 perspective comprises an act 210 of encapsulating a SOAP message in a user datagram. Act 210 includes encapsulating a SOAP message to be sent to the identified one or more computer systems with a user datagram, wherein the SOAP message contains a request for a response from each of the one or more computer systems. For example, the sending computer system creates an in-memory representation of message 110, and decides whether to encode the in-memory representation as text or binary information. The sending computer system also decides whether to include reply address information in the SOAP message, or to rely on anonymous addressing. An encoder at the sending computer system 100 then writes octets of the in-memory data structure into a user datagram 115.

FIG. 2 further shows that the method from the sending computer system 100 perspective comprises an act 220 of sending the user datagram to the one or more computers. Act 220 includes sending the user datagram to the identified one or more computer systems through a UDP communication protocol. For example, sending computer system 100 sends user datagram 115 through a UDP and IP protocol layer to an address that incorporates the "soap.udp" addressing scheme described herein. In other cases, the user datagram 115 is received by the corresponding receiving computer system using a UDP protocol, based on port information that is specific to UDP at the receiving computer system, and which is specifically set forth by the sending computer system 100 in the user datagram address.

In addition, FIG. 2 shows that the method from the receiving computer 135 perspective comprises an act 230 of receiving a user datagram. Act 230 includes receiving a user datagram from a sending computer system, the user datagram comprising a SOAP message that requests one or more available components at the receiving computer system. For example, receiving computer system 135 (or 150) receives a user datagram 115 from the sending computer system through UDP, such as through a previously-designated or otherwise default port associated with UDP. The receiving computer system then removes the IP and UDP layers, and decodes the encapsulated SOAP message 110.

FIG. 2 also shows that the method from the receiving computer 135 perspective comprises an act 240 of identifying a reply address. Act 240 includes identifying a reply address from at least a portion of the SOAP message. For example, receiving computer 135 identifies a specific "reply to" header and associated address data contained in that header in the SOAP message 110. Alternatively, in the case of an anonymous address (i.e., missing "reply to" field or associated data), the receiving computer system 135 constructs a reply address based on the IP address and/or port information contained in the UDP and IP layers of the user datagram 115. In still other cases, the receiving computer system 135 may determine not to send a reply at all, as previously described.

In addition, the method from the receiving computer 135 perspective comprises an act 250 of encapsulating a SOAP response message. Act 250 includes encapsulating a SOAP response message that is placed within a response user datagram. For example, upon processing a query included in SOAP message 110, receiving computer system 135 constructs a response SOAP message 145 that includes, for example, a list of available resources. The receiving computer system 135 then can perform a similar function as with the sending computer system 100, and decide an encoding format (e.g., text or binary). An encoder (not shown) at the receiving computer system 135 then encodes the SOAP message into response user datagram 140. One will appreciate that the SOAP response message can also be formatted to be sent via another traditionally non-UDP framing protocol, such as HTTP, HTTPS, or the like, which use TCP, FIG. 2 further shows that the method from the receiving computer 135 perspective comprises an act 260 of sending the response user datagram to the identified reply address through a UDP communication protocol, wherein the response user datagram includes a SOAP message identifying one or more available components at the receiving computer system. For example, the receiving computer system 135 passes the user datagram 140 (which contains the SOAP message 145 identifying available components) through the UDP and IP layers at the receiving computer system 135. The response user datagram 140 is then sent to the UDP port of the original sending computer system 100.

Accordingly, FIG. 2 shows that the method from the sending computer 100 perspective also comprises an act 270 of receiving a response user datagram. Act 270 includes receiving a response user datagram from at least one of the identified one or more computer systems. For example, the original sending computer system 100 receives, through UDP, a response user datagram 140 from receiving computer system 135. In other cases, however, the sending computer system 100 can also receive a response message from the receiving computer program through any communication protocol, such as a non-UDP protocol including HTTP, HTTPS, or the like. In any event, where a user datagram 140 was received over UDP, upon removing the UDP and IP layers of the user datagram 140, the original sending computer system decodes the encapsulated SOAP message 145, as appropriate, and reads the SOAP message 145 to identify the availability of one or more services at computer system 135. When received through other communication protocols, a similar decapsulation/decoding; and reading of the response message will be performed appropriate for the given communication protocol.

Accordingly, the schemas and methods described herein provide a number of implementations suitable for identifying available components on a network in an efficient manner. In particular, implementations of the present invention allow a computer system to identify services at multiple computer systems without necessitating a connection-oriented querying scheme. Furthermore, implementations of the present invention allow a computer system to find out a large number of services relatively quickly using multicasting addresses with UDP services. Still further, at least in part because SOAP messaging is used in conjunction with UDP, the implementations, schema, and methods described herein provide a high degree of interoperability with many types of computing systems.

FIG. 3 and the following discussion are intended to provide a brief, general description of a suitable computing environment in which the invention may be implemented. Although not required, the invention will be described in the general context of computer-executable instructions, such as program modules, being executed by computers in network environments. Generally, program modules include routines, programs, objects, components, data structures, etc. that perform particular tasks or implement particular abstract data types. Computer-executable instructions, associated data structures, and program modules represent examples of the program code means, for executing steps of the methods disclosed herein. The particular sequence of such:, executable instructions or associated data structures represents examples of corresponding acts for implementing the functions described in such steps.

Those skilled in the art will appreciate that the invention may be practiced in network computing environments with many types of computer system configurations, including personal computers, hand-held devices, multi-processor systems, microprocessor-based or programmable consumer electronics, network PCs, minicomputers, mainframe computers, and the like. The invention may also be practiced in distributed computing environments where local and remote processing devices perform tasks and are linked (either by hardwired links, wireless links, or by a combination of hardwired or wireless links) through a communications network. In a distributed computing environment, program modules may be located in both local and remote memory storage devices.

With reference to FIG. 3, an exemplary system for implementing the invention includes a general-purpose computing device in the form of a conventional computer 320, including a processing unit 321, a system memory 322, and a system bus 323 that couples various system components including the system memory 322 to the processing unit 321. The system bus 323 may be any of several types of bus structures including a memory bus or memory controller, a peripheral bus, and a local bus using any of a variety of bus architectures. The system memory includes read only memory (ROM) 324 and random access memory (RAM) 325. A basic input/output system (BIOS) 326, containing the basic routines that help transfer information between elements within the computer 320, such as during start-up, may be stored in ROM 324.

The computer 320 may also include a magnetic hard disk drive 327 for reading: from and writing to a magnetic hard disk 339, a magnetic disc drive 328 for reading from or writing to a removable magnetic disk 329, and an optical disc drive 330 for reading from or writing to removable optical disc 331 such as a CD ROM. The magnetic hard disk drive 327, magnetic disk drive 328, and optical disc drive 330 are connected to the system bus 323 by a hard disk drive interface 332, a magnetic disk drive-interface 333, and an optical drive interface 334, respectively. The drives and their associated computer-readable media provide nonvolatile storage of computer-executable instructions, program modules and other data for the computer 320. Although the exemplary environment described herein employs a magnetic hard disk 339, a removable magnetic disk 329 and a removable optical disc 331, other types of computer readable media for storing data can be used, including magnetic cassettes, flash memory cards, digital versatile disks, Bernoulli cartridges, RAMs, ROMs, and the like.

Program code means comprising one or more program modules may be stored on the hard disk 339, magnetic disk 329, optical disc 331, ROM 324 or RAM 325, including an operating system 335, one or more application programs 336, other program modules 337, and program data 338. A user may enter commands and information into the computer 320 through keyboard 340, pointing device 342, or other input devices (not shown), such as a microphone, joy stick, game pad, satellite dish, scanner, or the like. These and other input devices are often connected to the processing unit 321 through a serial port interface 346 coupled to system bus 323. Alternatively, the input devices may be connected by other interfaces, such as a parallel port, a game port or a universal serial bus (USB). A monitor 347 or another display device is also connected to system bus 323 via an interface, such as video adapter 348. In addition to the monitor, personal computers typically include other peripheral output devices (not shown), such as speakers and printers.

The computer 320 may operate in a networked environment using logical connections to one or more remote computers, such as remote computers 349a and 349b. Remote computers 349a and 349b may each be another personal computer, a server, a router, a network PC, a peer device or other common network node, and typically include many or all of the elements described above relative to the computer although only memory storage devices 350a and 350b and their associated application programs 336a and 336b have been illustrated in FIG. 3. The logical connections depicted in FIG. 3 include a local area network (LAN) 351 and a wide area network (WAN) 352 that are presented here by way of example and not limitation. Such networking environments are commonplace in office-wide or enterprise-wide computer networks, intranets and the Internet.

When used in a LAN networking environment, the computer 320 is connected to the local network 351 through a network interface or adapter 353. When used in a WAN networking environment, the computer 320 may include a modem 354, a wireless link, or other means for establishing communications over the wide area network 352, such as the Internet. The modem 354, which may be internal or external, is connected to the system bus 323 via the serial port interface 346. In a networked environment, program modules depicted relative to the computer 320, or portions thereof, may be stored in the remote memory storage device. It will be appreciated that the network connections shown are exemplary and other means of establishing communications over wide area network 352 may be used.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

We claim:

1. At a sending computer system in a computerized environment in which a sending computer seeks to identify one or more available network resources on a network, a method of sending a request to one or more computers for the available resources in a manner that does not necessarily incur the overhead of connection-oriented communication, comprising the acts of:

identifying the presence of one or more computer systems on a network;

encapsulating a simple object access protocol (SOAP) message within a user datagram by determining an appropriate formatting of the SOAP message for compliance with a user datagram protocol (UDP) communication protocol when sending the user datagram to the identified one or more computer systems, wherein the SOAP message comprises at least, (i) a request for an availability of one or more resources for the one or more computer systems, and (ii) a reply address for sending a response to the request;

sending the user datagram to the identified one or more computer systems through the UDP communication protocol; and receiving a response from at least one of the one or more computer systems that includes information about the availability of the one or more resources.

2. The method as recited in claim 1, wherein the response to the request within the user datagram is received from at least one of the identified one or more computer systems through a non-UDP communication protocol.

3. The method as recited in claim 1, wherein identifying one or more computer systems on the network comprises identifying a multicast address that is configured to direct communication to the one or more computer systems on the network.

4. The method as recited in claim 1, wherein identifying one or more computer systems comprises identifying at least one of a network address and a port number for the one or more computer systems on the network.

5. The method as recited in claim 1, wherein encapsulating a SOAP message further comprises determining one of a text or binary encoding type for the SOAP message.

6. The method as recited in claim 1, wherein encapsulating a SOAP message further comprises encoding a first portion of the user datagram with encoding information, such that encoding information does not necessarily need to be included in an encoding header of the response.

7. The method as recited in claim 1, wherein encapsulating the SOAP message further comprises including the reply address in a header of the SOAP message, wherein the reply address header includes at least one of a network address and a port number of the sending computer system.

8. The method as recited in claim 1, the response user datagram wherein receiving the response user datagram further comprises removing a UDP and internet protocol (IP) layer of the response user datagram, and decoding a response SOAP message based at least in part on encoding information for the response SOAP message identified in an initial portion of the response user datagram.

9. The method as recited in claim 1, wherein the SOAP message includes a request for available network resources at the identified one or more computer systems, and wherein the network resources include files or processing modules that can be accessed by the sending computer system.

10. At a receiving computer system in a computerized environment in which the receiving computer receives a request form a sending computer for one or more available network resources at tile receiving computer, a method of responding to the sending computer in a manner that does not necessarily incur the overhead of connection-oriented communication, comprising the acts of:
receiving a user datagram from a sending computer system through a user datagram protocol (UDP) communication protocol, the user datagram comprising a simple object access protocol (SOAP) message that requests one or more available resources at the receiving computer system;
identifying a reply address from at least a portion of the SOAP message;
encapsulating a SOAP response message within a response user datagram by determining an appropriate formatting of the SOAP response message for compliance with a UDP communication protocol; and
sending the response user datagram to the identified reply address through the UDP communication protocol, wherein the response user datagram includes a SOAP message identifying one or more available resources at the receiving computer system.

11. The method as recited in claim 10, further comprising identifying that one or more network resources at the receiving computer system are available, the network resources including files or processing modules that can be accessed by the sending computer system over the network.

12. The method as recited in claim 10, wherein the user datagram includes an address to a specific port at the receiving computer system.

13. The method as recited in claim 10, wherein receiving the user datagram from the sending computer system comprises removing a UDP and internet protocol (IP) layer of the user datagram, and decoding a SOAP message based at least in part on encoding information for the SOAP message identified in an initial portion of the user datagram.

14. The method as recited in claim 10, wherein identifying a reply address comprises identifying a reply header of the SOAP message in the user datagram received from the sending computer system.

15. The method as recited in claim 10, wherein identifying a reply address comprises identifying an IP address and a port of the sending computer system, such that the reply address of the response user datagram includes the IP address and the port of the sending computer system.

16. The method as recited in claim 10, wherein encapsulating a SOAP message within a response user datagram comprises determining one of a text or binary encoding for the SOAP message.

17. The method as recited in claim 10, wherein encapsulating a SOAP message within a response user datagram further comprises encoding an initial portion of the response user datagram with encoding information for the SOAP message, such that encoding information does not necessarily need to be included in an encoding header of the response SOAP message.

18. The method as recited in claim 10, wherein the user datagram from the sending computer system comprises an address to a multi-cast uniform resource identifier (URI), such that at least the receiving computer system receives the user datagram sent by the sending computer system through an intermediate node identified by the multi-cast URI.

19. At a sending computer system in a computerized environment in which one or more receiving computer systems on a network have one or more resources, a computer program product comprising computer-readable medium which encoded computer-executable instructions stored thereon that, when executed, cause one or more processors to perform a method of sending a request to one or more computers for the available resources in a manner that does not necessarily incur the overhead of connection-oriented communication, comprising the following:
identifying tile presence of one or more computer systems on a network;
encapsulating a simple object access protocol (SOAP) message within a user datagram by determining an appropriate formatting of the SOAP message for compliance with a user datagram protocol (UDP) communication protocol when sending the user datagram to the identified one or more computer systems, wherein the SOAP message comprises at least, (i) a request for an availability of one or more resources for the one or more computer systems, and (ii) a reply address for sending a response to the request;
sending the user datagram to the identified one or more computer systems through the UDP communication protocol; and
receiving a response from at least one of the one or more computer systems that includes information about the availability of the one or more resources.

* * * * *